US011663524B2

(12) United States Patent
Bikumala et al.

(10) Patent No.: US 11,663,524 B2
(45) Date of Patent: May 30, 2023

(54) SERVICES USING AI/ML TO SELECT VIRTUAL NETWORK FUNCTIONS AND VENDORS FOR SUPPLYING THE VIRTUAL NETWORK FUNCTIONS

(71) Applicant: EMC IP Holding Company LLC, Hopkinton, MA (US)

(72) Inventors: Sathish Kumar Bikumala, Round Rock, TX (US); Vasile Radoaca, Burlington, MA (US); Deepak NagarajeGowda, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 338 days.

(21) Appl. No.: 16/941,623

(22) Filed: Jul. 29, 2020

(65) Prior Publication Data

US 2022/0036418 A1 Feb. 3, 2022

(51) Int. Cl.
*G06N 20/00* (2019.01)
*H04L 41/14* (2022.01)
*H04L 41/16* (2022.01)

(52) U.S. Cl.
CPC .......... *G06N 20/00* (2019.01); *H04L 41/145* (2013.01); *H04L 41/16* (2013.01)

(58) Field of Classification Search
CPC ...... G06N 3/0454; G06N 3/088; G06N 20/00; H04L 41/145; H04L 41/16; H04L 41/5041; H04L 41/083; H04L 41/0876; H04L 41/142; H04L 41/30; H04L 61/5061; H04L 67/56; G06F 21/105; G06F 9/45529; G06F 9/505; H04N 21/234; H04W 36/0072
See application file for complete search history.

(56) References Cited

U.S. PATENT DOCUMENTS

| | | | |
|---|---|---|---|
| 2019/0220703 A1* | 7/2019 | Prakash | G06F 9/505 |
| 2019/0334788 A1* | 10/2019 | Lacey | G06F 21/105 |
| 2020/0067776 A1* | 2/2020 | Williams | H04L 41/0876 |
| 2020/0076708 A1* | 3/2020 | Kloberdans | H04L 61/5061 |
| 2020/0201874 A1* | 6/2020 | Reehil | G06F 9/45529 |
| 2020/0228602 A1* | 7/2020 | Spoczynski | H04L 67/56 |
| 2020/0322218 A1* | 10/2020 | Anwer | H04L 41/145 |
| 2021/0184925 A1* | 6/2021 | Narayanan | H04L 41/083 |
| 2021/0194774 A1* | 6/2021 | Yang | H04L 41/142 |
| 2021/0264456 A1* | 8/2021 | Kiani | H04L 41/30 |
| 2022/0086864 A1* | 3/2022 | Sabella | H04W 36/0072 |
| 2022/0197773 A1* | 6/2022 | Butler | H04N 21/234 |

* cited by examiner

*Primary Examiner* — Le H Luu
(74) *Attorney, Agent, or Firm* — Krishnendu Gupta; Deepika Bhayana (57) ABSTRACT

The disclosed systems and methods are directed to a computer-implemented method for use in designing a service. In at least one embodiment, a method includes designing a service with one or more generic virtual network functions (VNFs), where the generic VNFs are defined independent of vendor sourcing information. One or more trained machine learning (ML) models are used to identify VNFs available from VNF vendors that may source one or more VNFs similar to the generic VNFs. The service is implemented using VNFs provided by one or more VNF vendors, where the VNFs provided by the one or more VNF vendors have network functionality generating similar to the one or generic VNFs.

20 Claims, 8 Drawing Sheets

SERVICES USING AI/ML TO SELECT VIRTUAL NETWORK FUNCTIONS AND VENDORS FOR SUPPLYING THE VIRTUAL NETWORK FUNCTIONS

BACKGROUND OF THE INVENTION

Field of the Invention

The present disclosure relates to the design of services and, more particularly, to the design of services using Artificial Intelligence (AI) and/or Machine Language (ML) to select Virtual Network Functions (VNFs) and corresponding vendors for providing the VNFs.

Description of the Related Art

As the value and use of information continue to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHS may be employed in the design and development of a service (such as a Telco service). In reference to computer software, a service is software that performs automated tasks, responds to hardware events, or listens for data requests from other software. In some operating system, these services are loaded automatically at startup, and run in the background without user interaction.

SUMMARY OF THE INVENTION

A system of one or more computers can be configured to perform particular operations or actions by virtue of having software, firmware, hardware, or a combination of them installed on the system that in operation is used to design services using AI/ML to select VNFs and vendors for supplying the VNFs. Certain embodiments are directed to a computer-implemented method for use in designing a service. The method may include designing a service with one or more generic virtual network functions (VNFs), where the generic VNFs are defined independent of vendor sourcing information. One or more trained machine learning (ML) models are used to identify VNFs available from VNF vendors that may source one or more VNFs similar to the generic VNFs. The Service is implemented using VNFs provided by one or more VNF vendors, where the VNFs provided by the one or more VNF vendors have network functionality generating similar to the one or generic VNFs. Other embodiments of this aspect include corresponding computer systems, apparatus, and computer programs recorded on one or more computer storage devices, each configured to perform the actions of the methods.

In at least one embodiment, the one or more trained ML models include an ML quality model configured to assess the quality of VNFs provided by vendors. In at least one embodiment, the method includes execution of an unsupervised learning operation using raw data relating to past performance of vendors providing VNFs; and clustering and classifying data provided from the unsupervised learning operation to generate a set of training data. In at least one embodiment, the set of training data is used to train the ML quality model.

In at least one embodiment, the one or more trained ML models include an ML similarity scoring model configured to identify a degree of similarity between one or more of the generic VNFs and one or more VNFs available from the vendors. In at least one embodiment, the similarity scoring model is trained using data derived from VNF images, VNF descriptions, and taxonomy data available from the vendors; and where training the ML similarity scoring model further includes feature selection and engineering of features derived from the VNF images, VNF descriptions, and taxonomy data. The data derived from feature selection and feature engineering may be subject to localities sensitive hashing to train the ML similarity scoring model. In at least one embodiment, the one or more trained machine learning (ML) models provide VNF and vendor information including one or more VNF vendors, the VNFs available from VNF vendors that may source VNFs similar to the generic VNFs, VNF vendor quality metrics, similarity scores comparing vendors sourced VNFs with generic VNFs, and/or taxonomy data for VNFs.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

Embodiments of the present disclosure are directed to the use of Virtual Network Functions (VNFs) in Services used with a Network Function Virtualization Infrastructure (NFV). Certain embodiments of the present disclosure recognize the difficulty that Service Providers (SPs) face when designing and/or selecting VNFs and to vendors for such Services.

A Service (based on Intent driven model) is logically decomposed in multiple tiers, including Customer Service View (CSV), VNFs/C-VNFs (Cloud-VNFs) (collectively referenced as VNFs) that are recursively decomposed across network layers and domains, component/sub-components, Resources Management layers, and NF layers. Each VNF used in the Service should support ETSI, TOSCA/YANG in terms of Service/network topology, interdependencies, and Life Cycle Management (LCM) operations.

Certain embodiments of the disclosed system are directed to independent design/creation of the Service from deployment and implementation of the Service. Such independence allows SPs to dynamically insert specific Telco Vendors implementations into the service topology model (e.g., Service chained). Further, certain aspects of the disclosed system are implemented with an understanding that it may be desirable for SPs to design Services using VNFs that are independent of the supply chain. Certain embodiments of the disclosed system allow SPs to decoupled the Service design from implementations requiring VNFs from specific vendors. As such, the VNFs may be replaced, and/or operated VNFs on the customer' s/SLA requirements and SP business requirements. To this end, certain embodiments of the disclosed system using AI/ML, with, for example, reinforcement learning (AI_R_NFV), and consistent data sets, to automatically and objectively select VNFs from VNF vendors (prime/backup) that are implementing a specific network function behavior needed by the Service.

Figure 1:
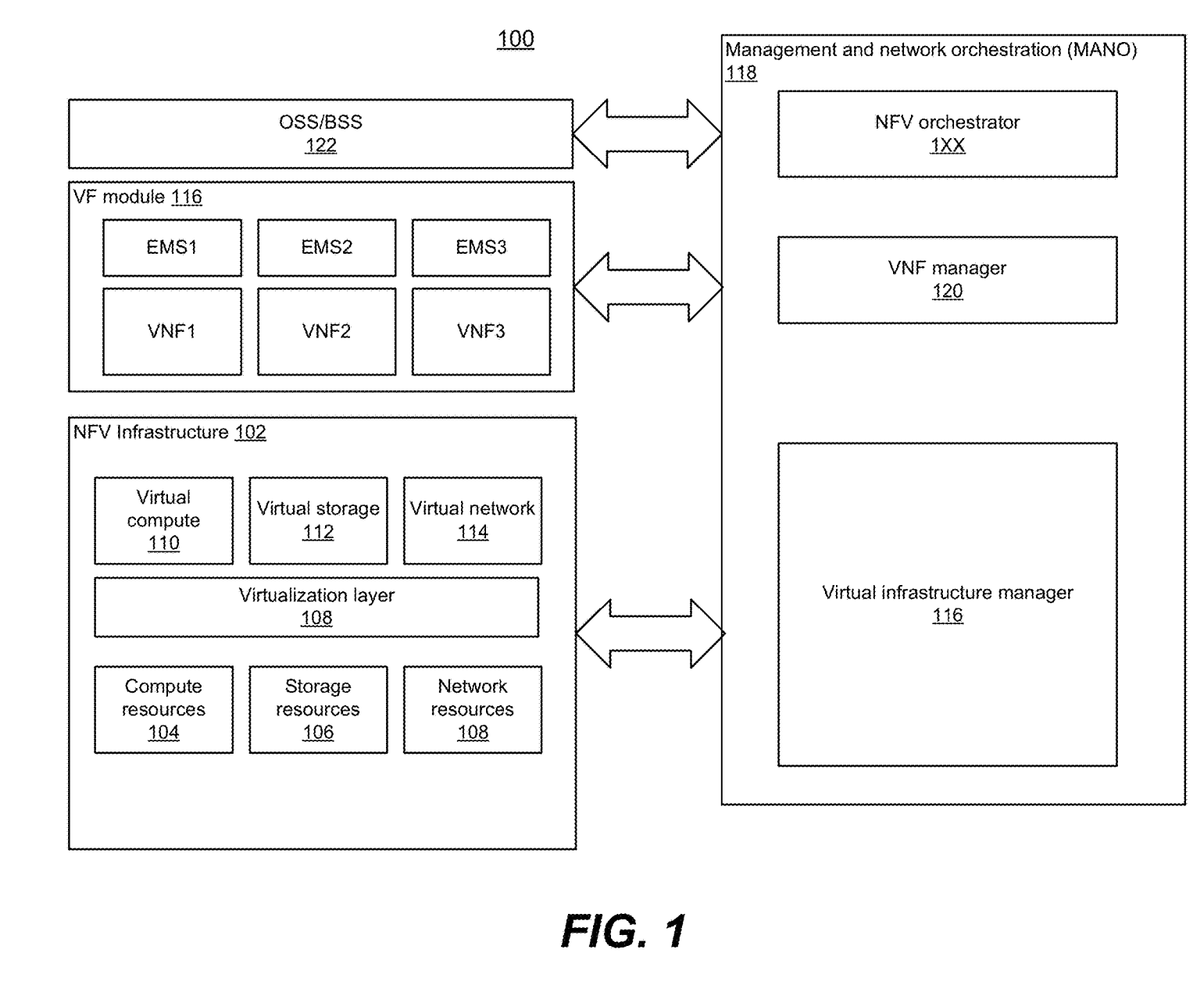
FIG. 1 is a schematic block diagram depicting one example of a Network Functional Virtualization (NFV) architecture in which certain embodiments of the disclosed system may operate.

FIG. 1 is a schematic block diagram depicting one example of a Network Function Virtualization infrastructure 102 (NFVI) in which certain embodiments of the disclosed system may operate. Generally stated, NFVI 102 may be implemented in, for example, a Cloud-based datacenter that contains hardware and virtual resources that build up the NFV environment. The Network Functions (NF) may include servers, switches, virtual machines and virtual networks, etc.

The embodiment of the NFV architecture 100 shown in FIG. 1 includes a Network Function Virtualization Infrastructure (NFVI) 102. The embodiment of the NFVI 102 shown in FIG. 1 includes a hardware resources plane, a virtualization plane, and a virtualized resources plane. In this example, the hardware resources plane gathers computing resources (X86 servers and RAM), storage resources (Disks, NAS) and networking resources (Switches, Routers, Firewalls) and is shown in FIG. 1 as compute resources 104, storage resources 106, and network resources 108. The virtualization plane, shown here as virtualization layer 108, abstracts the physical resources into a logical partition. The virtualized resources plane exposes the logical partitions as virtual compute 110, virtual storage, 112, and virtual network 114. The virtual computing resources, shown here as virtual compute 110, virtual storage 112, and virtual network 114 are exposed to VNFs used in service implementation. The resources in the NFVI 102 may be managed by a Virtual Infrastructure Manager 116 that is part of a management and network orchestration system (MANO) 118.

In certain embodiments, the NFV architecture 100 includes one or more Virtualization Function Modules 116 that are used by an SP to implement one or more services using one or more Virtual Network Functions, shown here as VNF1, VNF2, and VNF3. The Virtualized Network Functions VNF1, VNF2, and VNF3 are applications that realize one or several network functionalities such as, for example, switching, routing, Deep Packet Inspection, firewall, IMS, Carrier-grade NAT and by extrapolation all functions that are related to networking of the Service. Each VNF has a corresponding Element Management System (EMS), shown here as EMS1, EMS2, and EMS3. The EMS for each of the VNFs is configured as a centralized software that implements VNF management functions and communicates with VNF manager 120 of the MANO 118. The management functions may include Fault, Configuration, Accounting, Performance, and Security Management. An EMS may manage the VNFs through proprietary interfaces. There may be one EMS per VNF or one EMS that can manage multiple VNFs.

Certain embodiments of the NFV architecture 100 include an operations support system (OSS) and/or business support system (BSS). The OSS and BSS (shown collectively at 122) may be used in conjunction with one another to help the operator/service provide, judge, and assess the health of the NFV 100. The OSS may provide the operator with the ability to perform FCAPS (Fault Management, Configuration Management, Accounting Management, Performance Management and Security Management). In the BSS may be used to enable the operator to define the billing parameters, rate plans & associated logic, customer schemes, etc. The focus of the BSS is towards managing the business aspects associated with, for example, a telecommunications network.

Using traditional service design methodologies, VNFs and corresponding VNF vendors are selected to provide specific VNFs during the service design process. The service designer works with the VNF vendors without knowledge of the qualities of VNFs provided by the vendor. Further, the service designer does not know whether a desired type of VNF is available from the VNF vendor. Vendors that do not have experience designing a particular VNF may not have the experience to design a particular VNF type and provide substandard VNFs that may result in a lengthening of the design cycle since a substantial number of iterations may be required to obtain a VNF that meets system requirements. Nor does the service designer know which VNF vendors provide quality VNFs that comply with industry standards. Delays in the service design process are also impacted by such things as the VNF vendor's time to production of the VNFs. Still further, there often will be a vast amount of part numbers and other taxonomy data that may make it difficult for the service designer to find a particular VNF type available from a particular vendor. Various embodiments of the disclosed system are designed with a recognition of the problems of the traditional service design methodologies.

Figure 2:
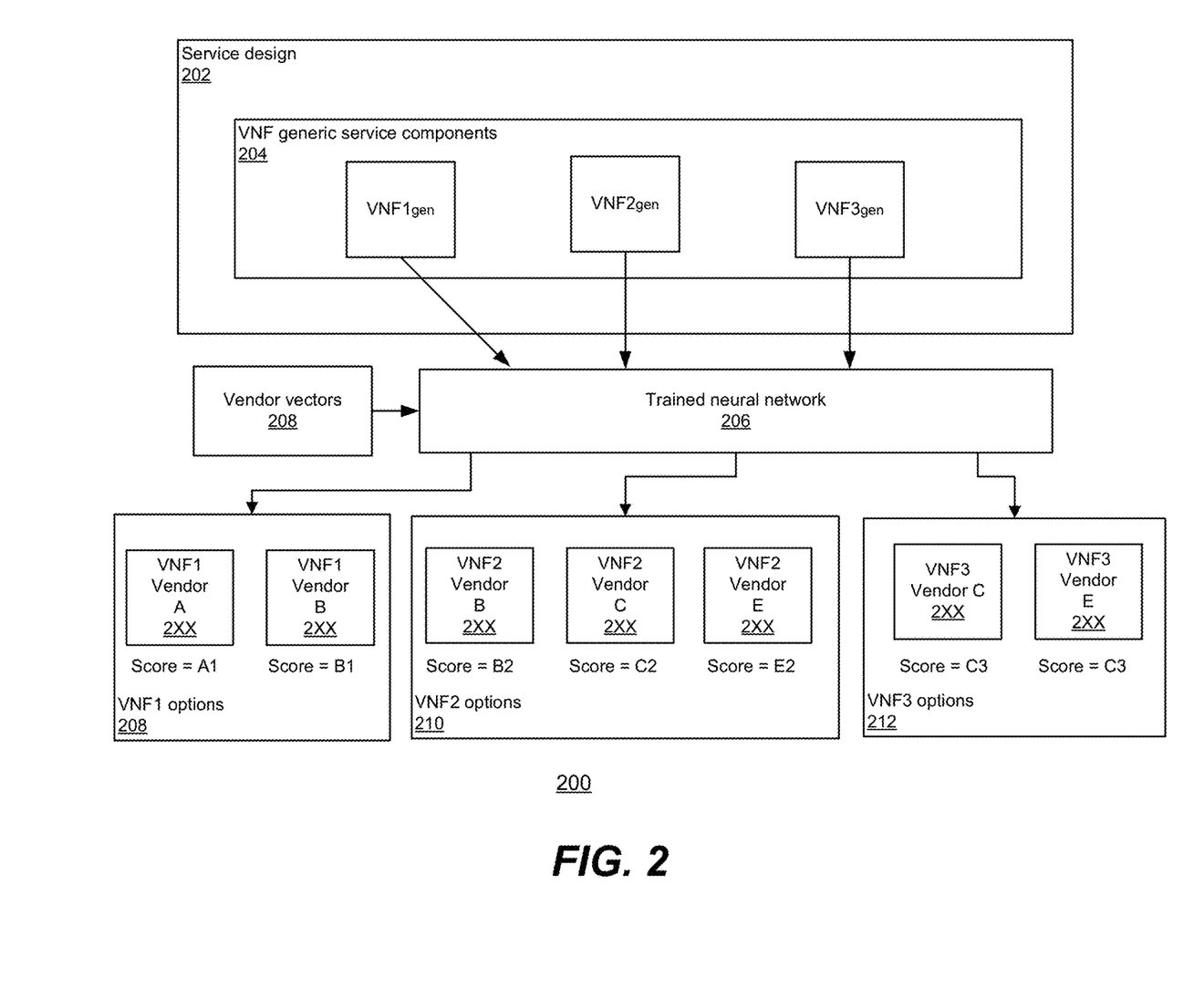
FIG. 2 depicts an exemplary environment in which certain embodiments of the disclosed system may operate.

FIG. 2 depicts an exemplary environment 200 in which certain embodiments of the disclosed system may operate. In this example, a service design module 202 is illustrated as containing a set of VNF generic service components 204, shown here as VNF(gen), VNF2(gen), and VNF3(gen). The generic VNF service components are defined during the design of the Service and are defined without reference to commercially available VNFs and VNF vendors. In the exemplary embodiment shown in FIG. 2, the generic VNFs VNF1(gen), VNF2(gen), and VNF3(gen) are designed as components without regard to specific VNFs that are commercially available from VNF vendors. Instead, the generic VNFs are designed, for example, using design templates or any other generic means of defining the attributes of a generic VNF.

Since the attributes of the generic VNFs are assigned during the high-level service design phase without reference to commercially available VNFs from commercial vendors. The initial design and refinement of the service design are independent of the need to request a revision of VNFs from VNF vendors. The service designer need not engage commercial VNF vendors to complete the service design, thereby streamlining the service design process. This is in contrast to traditional service design methodologies, where the Service is designed with specific VNFs that are to be delivered by specific commercial VNF vendors.

During the design process, the generic VNFs are honed to optimize the operation of the Service. Once a service has been thoroughly evaluated using the generic VNFs, it is time to proceed with commercial VNF and vendor selection.

In FIG. 2, the attributes of each generic service component, VNF1(gen), VNF2(gen), and VNF3(gen) are provided to the input of a trained neural network 206. Further, the trained neural network 206 is configured to receive vendor vector information 208. The vendor vector information 208 includes information relating, for example, to the types of VNFs available from commercial vendors, the quality of services provided by the vendors, the quality of VNFs designed by the vendors, and any other information suitable for assessing whether a vendor can timely provide quality VNFs that correspond to generic VNFs (e.g., VNF1(gen), VNF2(gen), and VNF3(gen)) used in the service design.

In the specific example shown in FIG. 2, the trained neural network 206 receives the attributes and requirements for VNF1(gen), VNF2(gen), and VNF3(gen) for processing. Additionally, the trained neural network 206 is configured to receive vendor vector information 208. In certain embodiments, the vendor vectors may include vendor quality information as VNF SLA compliance, lists of VNFs with known issues, severity, number of KPI failures, VNF production time, VNF design attributes, etc. In certain embodiments, the VNFs available from commercial vendors are compared against the generic VNFs used at the service design level. In certain embodiments, the trained neural network 206 identifies commercially available VNFs that are similar to the generic VNFs used in the Service. Likewise, the trained neural network 206 executes an overall quality assessment of each VNF vendor that is capable of delivering a VNF that is similar to a generic VNF to identify high-quality vendors capable of providing the VNFs needed to design the Service.

In certain embodiments, the trained neural network 206 identifies vendors that can provide the VNFs for the Service. Additionally, the trained neural network 206 provides a quality score for the vendors. The quality score may be based on various factors indicating the ability of the vendor to provide the VNFs for the Service, the cost of procuring the VNFs for the Service, the ability of the vendor to meet project deadlines, etc.

In the example shown in FIG. 2, the trained neural network 206 has identified multiple vendors that can provide VNFs to implement the generic VNFs included in the Service. Here, the trained neural network 206 has suggested Vendor A and Vendor B for provision VNF1. Vendor A has a quality score of A1 for the provision of VNF1, while Vendor B has a quality score of B2 for the provision of VNF1. Similarly, the trained neural network 206 has suggested Vendor B, Vendor C, and Vendor E for the provision of VNF2. Vendor B has a quality score of B2 for the provision of VNF2, Vendor C as a quality score of C2 for the provision of VNF2, and vendor E has a quality score of E2 for the provision of VNF2. As such, the service designer is provided with multiple sources for a given VNF and has not tied any of the VNFs used in the Service to a single VNF vendor. Consequently, the VNFs used in the Service are not tied to the supply chain for the Service. Further, the service designer is provided with quality scores for each of the vendors that can supply particular VNFs so that the service designer has the opportunity to select vendors dependent their quality scores for the provision of the VNFs used in the Service.

Figure 3:
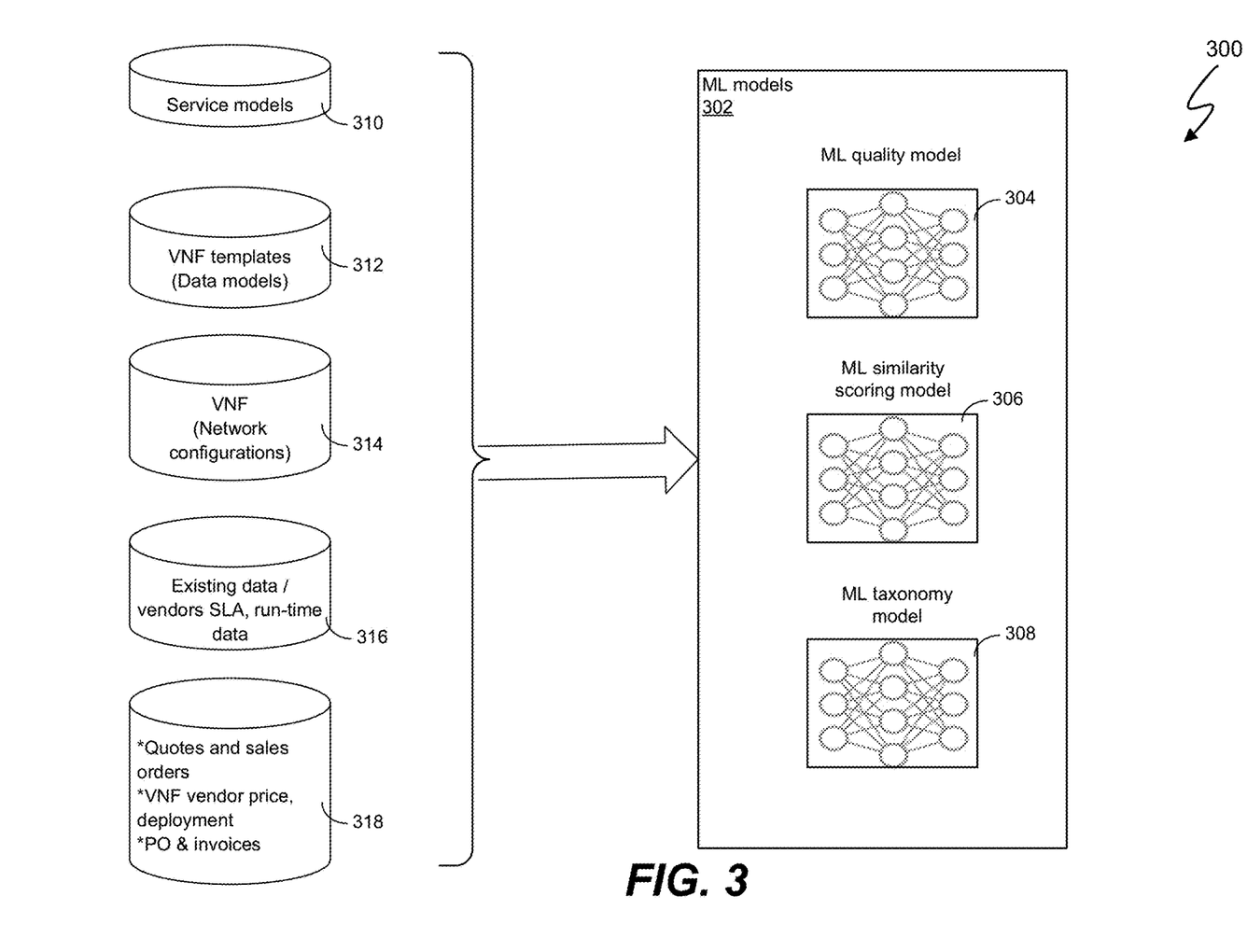
FIG. 3 is a block diagram showing the training of ML modules that may be included in certain embodiments of the disclosed system.

FIG. 3 is a block diagram 300 showing the training of ML modules that may be included in certain embodiments of the disclosed system. The example shown in FIG. 3 includes a set of ML models 302 that are trained to provide various types of data which allow a service designer to design a service using a set of generic VNFs, identifying vendors that can supply commercial versions of the VNFs, and providing vendor scores that the service designer may use in the selection of a VNF vendor.

In FIG. 3, the ML models 302 include an ML quality model 304, and ML similarity scoring model 306, and an ML taxonomy model 308. In certain embodiments, the ML quality model 304 is used to assess the quality of the services provided by a vendor including, for example, the ability of the vendor to provide a quality VNF for use in the service design, the cost of developing a VNF using the vendor, the ability of the vendor to meet project deadlines, the ability of the vendor to deliver standard-compliant VNFs, the ability of the vendor to deliver bug-free VNFs, etc.

The ML similarity scoring model 306 shown in FIG. 3 may be used to identify VNFs that meet the same or similar requirements imposed by the generic VNFs in the high-level service design. The ML similarity scoring model 306 may also provide a similarity score that can be incorporated in, for example, the quality score for a vendor that is being considered for providing the VNF's. Additionally, or in the alternative, the similarity score may be provided to the designer as a score that is separate from the quality score of the vendor.

In certain embodiments, it may be difficult to identify product information (e.g., part name, part number, parts group, etc.) needed to order a particular VNF from the vendor. Therefore, certain embodiments of the ML models 302 may include the ML taxonomy model 308. The ML taxonomy model 308 may correlate a VNF that is identical or similar to the generic VNF to provide, for example, vendor product identification information that may be used to order the VNF from the vendor. In certain embodiments, the ML taxonomy model 308 may correlate prices of VNFs available from the VNF vendors with prices of other VNF vendors to compare prices for VNFs provided by different vendors.

FIG. 3 also shows exemplary data that may be used to train the ML models 302. Such information may include one or more of: 1) service models 310 of services designed by service designers within the enterprise; 2) VNF templates and data models 312 used in the design of services within the enterprise; 3) network configurations 314 that use the VNFs provided by a vendor; and 4) existing data 316 relating to the vendor's SLA compliance, run-time behaviors exhibited by VNFs provided by a vendor (e.g., errors occurring during run-time), etc. It will be recognized, in view of the teachings of the present disclosure, that the training data may include data other than the data disclosed in FIG. 3. For example, it is possible to use a subset of the training data described herein. In other examples, it is possible to use additional data types than those described herein. Accordingly, the training data shown in FIG. 3 should be considered as non-limiting examples.

Figure 4:
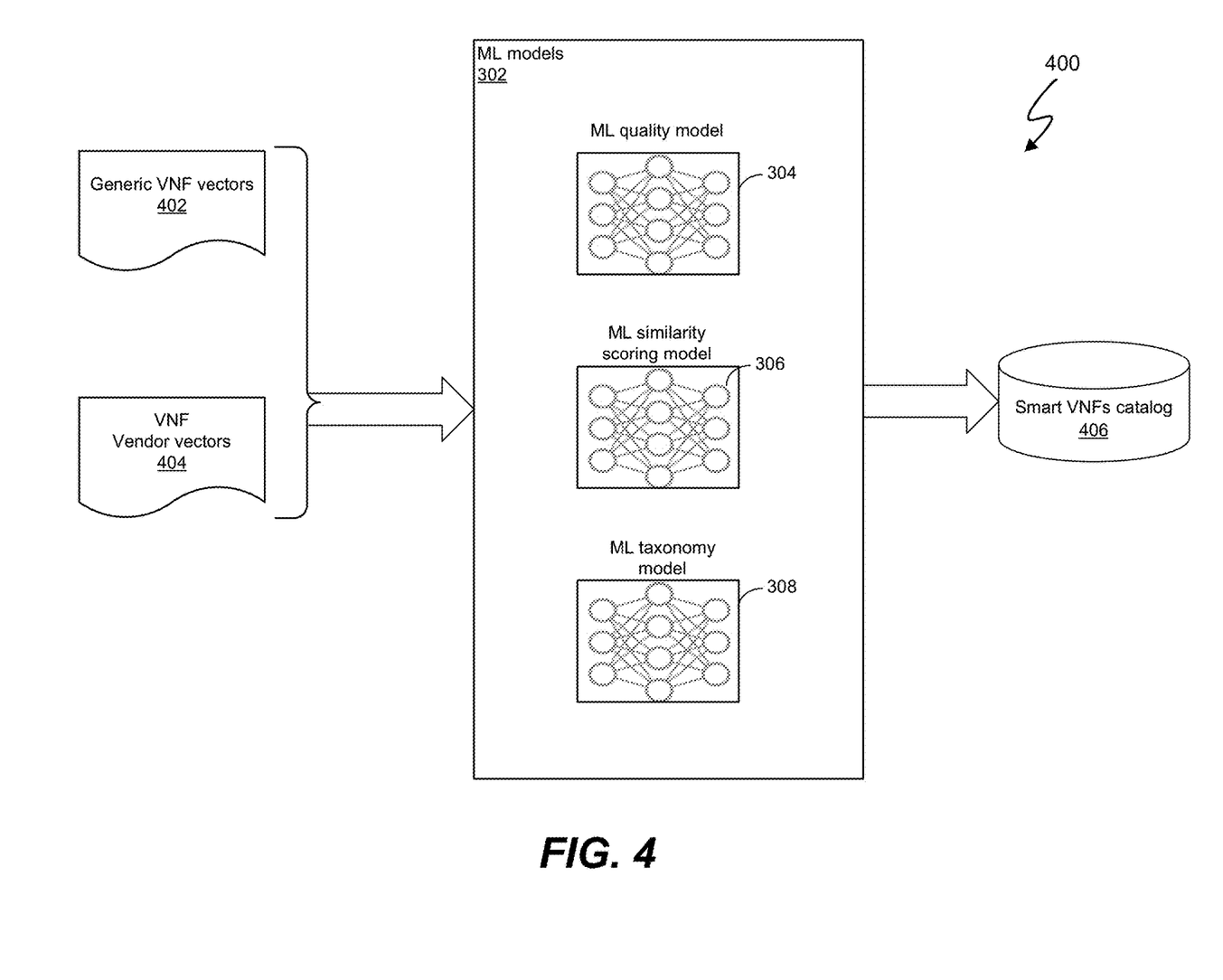
FIG. 4 is a block diagram showing the use of certain embodiments of the ML modules after training.

FIG. 4 is a block diagram 400 showing the use of certain embodiments of the ML models 302 after training. In certain embodiments, the ML models 302 have been trained in the manner shown in FIG. 3.

In the example shown in FIG. 4, the ML models 302 are configured to receive a set of one or more generic VNF vectors 402 and a set of one or more VNF vendor vectors. The generic VNF vectors 402 have dimensions representative of the generic VNFs used in the design of the Service, while the vendor VNF vectors 404 have dimensions that are analyzed with and intelligently compared to the generic VNF vectors 402 to provide the information corresponding to the ability of one or more VNF vendors to provide high-quality commercial VNFs in a timely and cost-effective manner.

In certain embodiments, information relating to the analysis is stored in a smart VNFs catalog 406. There are various manners of arranging the information in the smart VNFs catalog 406. In certain embodiments, the smart VNFs catalog may store VNFs on a service-by-service basis so that a search using the service type and/or service name retrieves all of the VNFs associated with a given service type and/or service name. In certain embodiments, if a service is located, all or a portion of the commercially available VNF and VNF vendor data may be reevaluated through one or more ML models. In such instances, the service designer is provided with the most recent data regarding the commercially available VNF and VNF vendors to render a decision as to whether a VNF from a particular vendor should be replaced using a VNF from another vendor. In certain embodiments, the smart VNFs catalog may be arranged by generic VNFs. As such, a service designer may build a variety of services using a set of searchable generic VNFs without the need to design additional generic VNFs for the Service. In such instances, a generic VNF may be used across multiple services.

Figure 5:
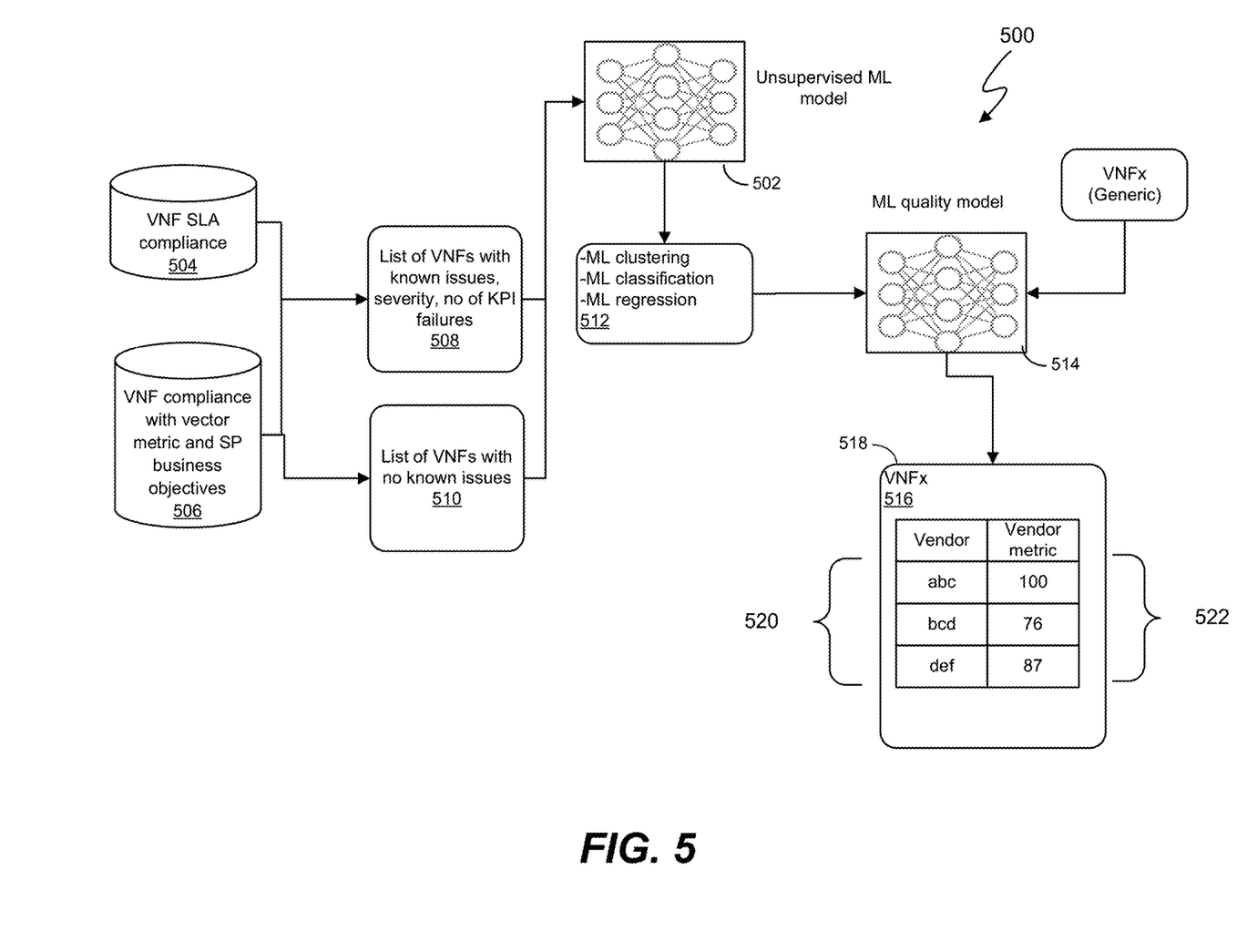
FIG. 5 is a system diagram for generating a list of suppliers and corresponding vector metrics that may be used in certain embodiments of the disclosed system.

FIG. 5 is a system diagram 500 for generating a list of suppliers and corresponding vector metrics that may be used in certain embodiments of the disclosed system. In this example, available data regarding the vendor is provided to the input of an unsupervised machine learning model 502. Data for the unsupervised model may come from a variety of sources. In the illustrated example, datastore 504 may include data regarding VNF service level agreement and compliance. Datastore 506 may include data regarding VNF compliance with vector metric and service provider business objectives. The data obtained from datastores 504 and 506 may be collected to generate lists 508 relating to VNFs provided by various vendors. In this example, the information may include information relating to VNFs with known issues provided by a vendor, the severity of the known issues, and the number of key performance indicator failures. Additionally, certain embodiments may use the data in datastores 504 and 506 to generate a list of VNFs 510 that do not have any known issues.

In the example shown in FIG. 5, the data in lists 508 and 510 are provided to the input of the unsupervised machine learning model 502. The data of the unsupervised machine learning model 502 may undergo operations for providing a labeled data set used to train an ML quality model 514. In certain embodiments, the ML quality model 514 is configured to receive information relating to a generic VNFx. The VNFx information is processed by the ML quality model 514 to identify multiple vendors and corresponding vendor metrics relating to the vendors' ability to provide a high-quality commercial VNF for the generic VNFx. FIG. 5 displays one example of a table 516 showing generic VNFx 518, vendor suppliers 520, and corresponding vendor metrics 522 that a service designer may use to identify a reliable source for the commercial VNF.

Figure 6:
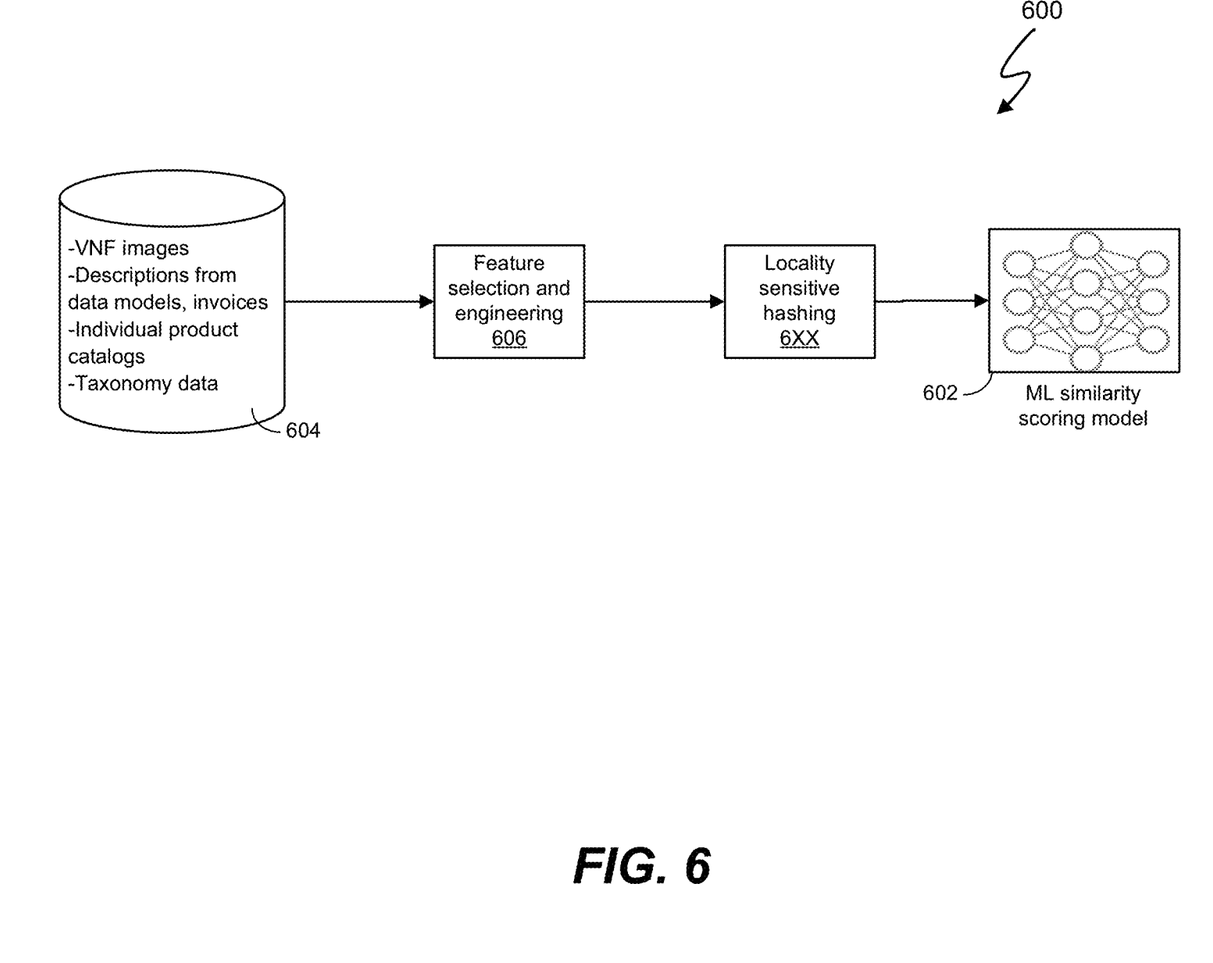
FIG. 6 is a system diagram showing one manner in which an ML similarity scoring model may be trained.

FIG. 6 is a system diagram 600 showing one manner in which an ML similarity scoring model 602 may be trained. In this example, the information in data store 604 is subject to feature selection and engineering at 606. Exemplary information found in data store 604 may include information relating to VNFs available from commercial vendors, and taxonomy data that may be used to identify specific part numbers, etc., for the available VNFs. In FIG. 6, the exemplary data store 604 includes 1) VNF images, 2) descriptions of VNFs from data models, invoices, etc., 3) individual product catalogs, and 4) taxonomy data.

As noted herein, the information in data store 604 is subject to feature selection and engineering at 606. As used herein, feature engineering is the process of using domain knowledge to extract features from raw data, such as the raw data found in data store 604, via data mining techniques. The transformation of raw data into features helps to better represent the underlying problem to the predictive models, resulting in improved model accuracy on unseen data. In certain embodiments, the data that has been subject to feature selection and engineering at 606 is subject to a locality sensitive hashing at 608 to identify VNFs that are statistically close to one another using the identified features.

Figure 7:
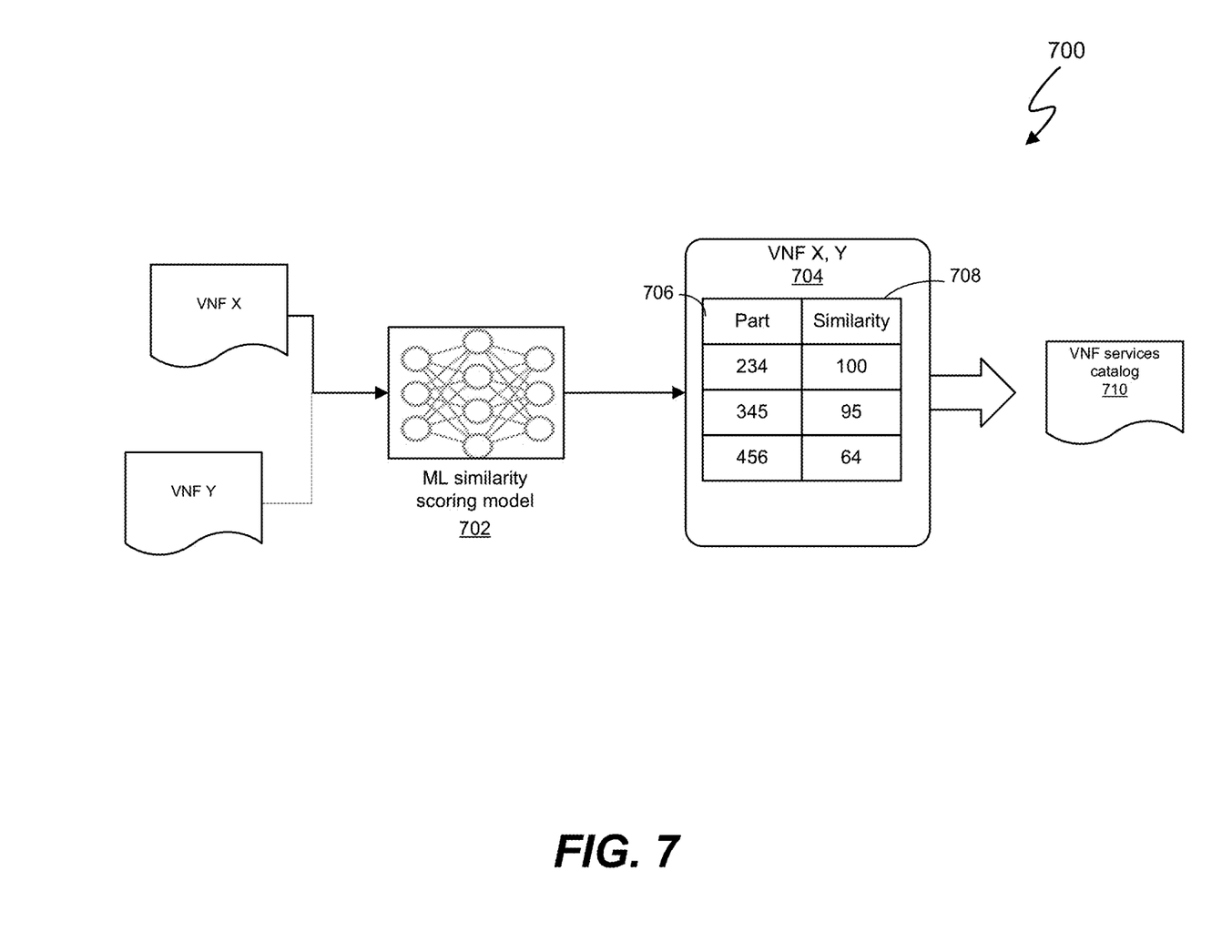
FIG. 7 is a system diagram showing the operation of a trained ML similarity scoring model as used in certain embodiments of the disclosed system.

FIG. 7 is a system diagram 700 showing the operation of a trained ML similarity scoring model 702 as used in certain embodiments of the disclosed system. In this example, the ML similarity scoring model 702 receives information defining the generic VNF, shown here as VNFx. The ML similarity scoring model 702 also receives information that defines commercially available VNFs, shown here as VNFy. In certain embodiments, the generic VNFx is compared with commercially available VNFys available from multiple vendors resulting in a smart VNF table 704. In certain embodiments, the VNF table 704 includes part numbers 706 for the VNFys. The part numbers 706 are identified with a similarity score 708 indicative of the degree to which the VNFys available from the commercial vendors are similar to the generic VNFx designed for the Service. In certain embodiments, the information in table 704 may be consolidated with the information in table 516 (see FIG. 5) in a VNF services catalog 710.

Figure 8:
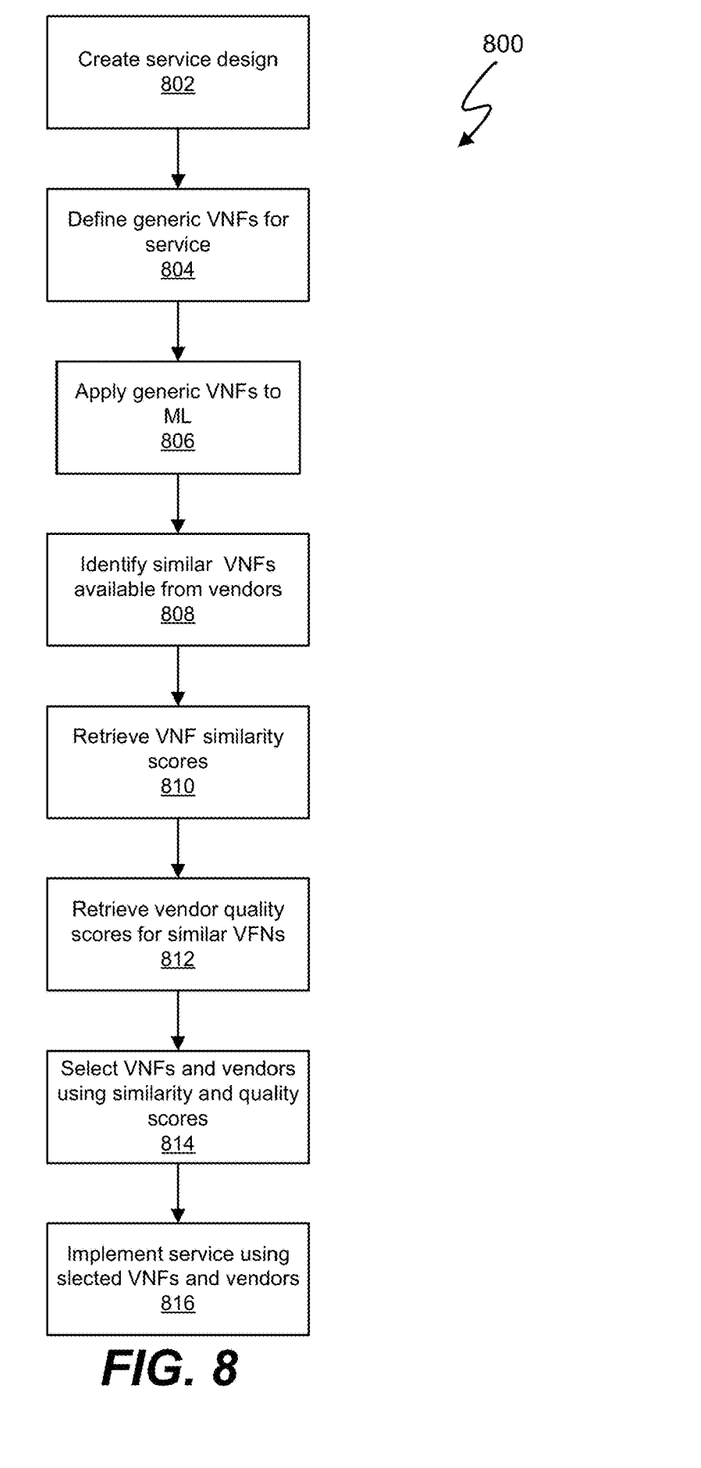
FIG. 8 is a flowchart depicting exemplary operations that may be executed in certain embodiments of the disclosed system.

FIG. 8 is a flowchart 800 depicting exemplary operations that may be executed in certain embodiments of the disclosed system. In this example, a service design is created at 802. Generic VNFs for the service design are defined at 804. The generic VNFs are provided to one or more ML models (see, e.g., ML models 302 in FIG. 3). The ML models identify commercially available VNFs that are similar to the generic VNFs at 808. In certain embodiments, the similarity scores for commercially available VNFs are determined at 810, and vendor quality scores for vendors VFNs similar to the generic VNFs are determined at 812. At 814, the service designer is provided with part numbers and vendor scores for vendors that may potentially be accepted in the final service design. The service designer may implement the Service using selected VNFs and vendors at 816. In implementing the Service at 816, the service designer is not tied to the use of a specific VNF from a specific vendor. Rather, operations 804 through 814 may be repeated to identify different vendors capable of providing VNFs similar to the generic VNFs, while also delivering a high-quality product within service design/modification deadlines.

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only and are in no way exhaustive of the scope of the claims.

Such example systems and computing devices are merely examples suitable for some implementations and are not intended to suggest any limitation as to the scope of use or functionality of the environments, architectures, and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system X210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method for use in designing a service, the method comprising:
   designing a service with one or more generic virtual network functions (VNFs), wherein each of the generic VNFs is defined to provide a generic network functionality independent of vendor sourcing information;

using one or more trained machine learning (ML) models to identify available VNFs from VNF vendors that source one or more VNFs to implement the generic network functionality;

determining a similarity score for each implementation of the generic network functionality by a respective one of the available VNFs;

using the similarity score for each implementation of the generic network functionality to select one of the available VNFs to implement the generic network functionality; and implementing the service using the selected one of the available VNFs to implement the generic network functionality.

2. The computer-implemented method of claim 1, wherein the one or more trained ML models include an ML quality model configured to assess a quality of VNFs provided by vendors.

3. The computer-implemented method of claim 2, wherein the method further comprises:

executing an unsupervised learning operation using raw data relating to past performance of vendors providing VNFs;

clustering and classifying data provided from the unsupervised learning operation to generate a set of training data; and using the set of training data to train the ML quality model.

4. The computer-implemented method of claim 1, wherein the one or more trained ML models include an ML similarity scoring model configured to identify a degree of similarity between one or more of the generic VNFs and one or more VNFs available from the vendors.

5. The computer-implemented method of claim 4, wherein the ML similarity scoring model is trained using data derived from VNF images, VNF descriptions, and taxonomy data available from the vendors; and wherein training the ML similarity scoring model further includes feature selection and engineering of features derived from the VNF images, VNF descriptions, and taxonomy data.

6. The computer-implement method of claim 5, wherein the data derived from feature selection and feature engineering are subject to localities sensitive hashing to train the ML similarity scoring model.

7. The computer-implemented method of claim 1, wherein the one or more trained machine learning (ML) models provide VNF and vendor information including one or more VNF vendors, the VNFs available from VNF vendors that source VNFs similar to the generic VNFs, VNF vendor quality metrics, similarity scores comparing vendors sourced VNFs with generic VNFs, and/or taxonomy data for VNFs provided by vendors, and wherein the VNF and vendor information is stored in a smart VNF catalog.

8. A computer system comprising:

one or more information handling systems, wherein the one or more information handling systems include:
 a processor;
 a data bus coupled to the processor; and
 a non-transitory, computer-readable storage medium embodying computer program code, the non-transitory, computer-readable storage medium being coupled to the data bus;

wherein the computer program code included in one or more of the information handling systems is executable by the processor of the information handling system so that the information handling system, alone or in combination with other information handling systems, executes operations comprising:

designing a service with one or more generic virtual network functions (VNFs), wherein each of the generic VNFs is defined to provide a generic network functionality independent of vendor sourcing information;

using one or more trained machine learning (ML) models to identify available VNFs from VNF vendors that source one or more VNFs to implement the generic network functionality;

determining a similarity score for each implementation of the generic network functionality by a respective one of the available VNFs;

using the similarity score for each implementation of the generic network functionality to select one of the available VNFs to implement the generic network functionality; and implementing the service using the selected one of the available VNFs to implement the generic network functionality.

9. The system of claim 8, wherein the one or more trained ML models include an ML quality model configured to assess a quality of VNFs provided by vendors.

10. The system of claim 9, wherein the operations further comprise:

executing an unsupervised learning operation using raw data relating to past performance of vendors providing VNFs;

clustering and classifying data provided from the unsupervised learning operation to generate a set of training data; and using the set of training data to train the ML quality model.

11. The system of claim 8, wherein the one or more trained ML models include an ML similarity scoring model configured to identify a degree of similarity between one or more of the generic VNFs and one or more VNFs available from the vendors.

12. The system of claim 11, wherein the ML similarity scoring model is trained using data derived from VNF images, VNF descriptions, and taxonomy data available from the vendors; and wherein training the ML similarity scoring model further includes feature selection and engineering of features derived from the VNF images, VNF descriptions, and taxonomy data.

13. The system of claim 12, wherein the data derived from feature selection and feature engineering are subject to localities sensitive hashing to train the ML similarity scoring model.

14. The system of claim 8, wherein the one or more trained machine learning (ML) models provide VNF and vendor information including one or more VNF vendors, the VNFs available from VNF vendors that source VNFs similar to the generic VNFs, VNF vendor quality metrics, similarity scores comparing vendors sourced VNFs with generic VNFs, and/or taxonomy data for VNFs provided by vendors, and wherein the VNF and vendor information is stored in a smart VNF catalog.

15. A non-transitory, computer-readable storage medium embodying computer program code, the computer program code comprising computer-executable instructions configured for:
  designing a service with one or more generic virtual network functions (VNFs), wherein each of the generic VNFs is defined to provide a generic network functionality independent of vendor sourcing information;
  using one or more trained machine learning (ML) models to identify available VNFs from VNF vendors that source one or more VNFs to implement the generic network functionality;
  determining a similarity score for each implementation of the generic network functionality by a respective one of the available VNFs;
  using the similarity score for each implementation of the generic network functionality to select one of the available VNFs to implement the generic network functionality; and
  implementing the service using the selected one of the available VNFs to implement the generic network functionality.

16. The non-transitory, computer-readable storage medium of claim 15, wherein
  the one or more trained ML models include an ML quality model configured to assess a quality of VNFs provided by vendors.

17. The non-transitory, computer-readable storage medium of claim 16, wherein the instructions are further configured for:
  executing an unsupervised learning operation using raw data relating to past performance of vendors providing VNFs;
  clustering and classifying data provided from the unsupervised learning operation to generate a set of training data; and
  using the set of training data to train the ML quality model.

18. The non-transitory, computer-readable storage medium of claim 15, wherein
  the one or more trained ML models include an ML similarity scoring model configured to identify a degree of similarity between one or more of the generic VNFs and one or more VNFs available from the vendors.

19. The non-transitory, computer-readable storage medium of claim 18, wherein
  the ML similarity scoring model is trained using data derived from VNF images, VNF descriptions, and taxonomy data available from the vendors; and
  wherein training the ML similarity scoring model further includes feature selection and engineering of features derived from the VNF images, VNF descriptions, and taxonomy data.

20. The non-transitory, computer-readable storage medium of claim 15, wherein
  the one or more trained machine learning (ML) models provide VNF and vendor information including one or more VNF vendors, the VNFs available from VNF vendors that source VNFs similar to the generic VNFs, VNF vendor quality metrics, similarity scores comparing vendors sourced VNFs with generic VNFs, and/or taxonomy data for VNFs provided by vendors, and wherein the VNF and vendor information is stored in a smart VNF catalog.

* * * * *